(12) United States Patent
Scott et al.

(10) Patent No.: US 7,931,460 B2
(45) Date of Patent: Apr. 26, 2011

(54) MATERIAL DELIVERY SYSTEM FOR USE IN SOLID IMAGING

(75) Inventors: Suzanne M. Scott, Springfield, VT (US); Charles R. Sperry, Florence, MA (US); Dennis F. McNamara, Charlestown, NY (US)

(73) Assignee: 3D Systems, Inc., Rock Hill, SC (US)

( * ) Notice: Subject to any disclaimer, the term of this patent is extended or adjusted under 35 U.S.C. 154(b) by 799 days.

(21) Appl. No.: 11/416,811

(22) Filed: May 3, 2006

(65) Prior Publication Data

US 2007/0257055 A1    Nov. 8, 2007

(51) Int. Cl.
    *B29C 31/00*    (2006.01)
(52) U.S. Cl. .................. 425/215; 425/217; 425/219
(58) Field of Classification Search .......... 425/215–217, 425/219, 375; 264/497
    See application file for complete search history.

(56) References Cited

U.S. PATENT DOCUMENTS

| | | |
|---|---|---|
| 4,752,498 A | 6/1988 | Fudim |
| 5,014,207 A | 5/1991 | Lawton |
| 5,049,901 A | 9/1991 | Gelbart |
| 5,094,935 A | 3/1992 | Vassiliou et al. |
| 5,096,530 A | 3/1992 | Cohen |
| 5,122,441 A | 6/1992 | Lawton et al. |
| 5,132,723 A | 7/1992 | Gelbart |
| 5,134,962 A * | 8/1992 | Amada et al. ............... 118/688 |
| 5,143,817 A | 9/1992 | Lawton et al. |
| 5,158,858 A | 10/1992 | Lawton et al. |
| 5,171,490 A | 12/1992 | Fudim |
| 5,192,559 A | 3/1993 | Hull et al. |
| 5,236,812 A | 8/1993 | Vassiliou et al. |
| 5,247,180 A | 9/1993 | Mitcham et al. |
| 5,306,446 A | 4/1994 | Howe |
| 5,391,072 A | 2/1995 | Lawton et al. |
| 5,429,908 A | 7/1995 | Hokuf et al. |
| 5,447,822 A | 9/1995 | Hull et al. |
| 5,474,719 A | 12/1995 | Fan et al. |
| 5,529,473 A | 6/1996 | Lawton et al. |
| 5,650,260 A | 7/1997 | Onishi |
| 6,051,179 A | 4/2000 | Hagenau |
| 6,066,285 A | 5/2000 | Kumar |
| 6,120,404 A | 9/2000 | Walworth et al. |

(Continued)

FOREIGN PATENT DOCUMENTS

DE    19957370 A1    11/1999

(Continued)

OTHER PUBLICATIONS

U.S. Appl. No. 11/856,378, filed Sep. 17, 2007.

(Continued)

*Primary Examiner* — Christina Johnson
*Assistant Examiner* — Xue Liu
(74) *Attorney, Agent, or Firm* — William A. Simons; Keith A. Roberson (57) ABSTRACT

A disposable liquid build material feed cartridge for use in a solid imaging apparatus and a method of dispensing build material for use in such an apparatus with a radiation transparent build material carrier. The disposable liquid build material feed cartridge recovers unused liquid material from the radiation transparent build material carrier and recycles it through a filter into a supply reservoir for reuse. A dispersing roller is employed to express any entrapping air bubbles in the solidifiable liquid build material that is dispensed onto the radiation transparent build material carrier prior to its being imaged.

14 Claims, 8 Drawing Sheets

U.S. PATENT DOCUMENTS

| | | | |
|---|---|---|---|
| 6,174,156 B1 | 1/2001 | Chapman et al. | |
| 6,206,672 B1 | 3/2001 | Grenda | |
| 6,305,769 B1 * | 10/2001 | Thayer et al. | 347/1 |
| 6,391,245 B1 | 5/2002 | Smith | |
| 6,500,378 B1 | 12/2002 | Smith | |
| 6,547,552 B1 | 4/2003 | Fudim | |
| 6,641,772 B2 | 11/2003 | Gelbart | |
| 6,665,048 B1 | 12/2003 | Gelbart | |
| 6,733,267 B2 | 5/2004 | Chapman et al. | |
| 6,792,327 B1 | 9/2004 | Bamford | |
| 6,824,714 B1 | 11/2004 | Turck et al. | |
| 6,942,830 B2 | 9/2005 | Mulhaupt et al. | |
| 6,965,364 B1 | 11/2005 | Eggers et al. | |
| 7,052,263 B2 | 5/2006 | John | |
| 7,090,484 B2 | 8/2006 | Ueno | |
| 7,128,866 B1 | 10/2006 | Henningsen | |
| 7,158,849 B2 | 1/2007 | Huang et al. | |
| 7,195,472 B2 | 3/2007 | John | |
| 7,261,542 B2 | 8/2007 | Hickerson et al. | |
| 2002/0145213 A1 | 10/2002 | Liu et al. | |
| 2002/0153640 A1 | 10/2002 | John | |
| 2002/0155189 A1 * | 10/2002 | John | 425/174.4 |
| 2003/0021823 A1 | 1/2003 | Landers et al. | |
| 2004/0173946 A1 | 9/2004 | Pfeifer et al. | |
| 2005/0017393 A1 | 1/2005 | Stockwell et al. | |
| 2005/0062815 A1 * | 3/2005 | Yoshihira et al. | 347/89 |
| 2005/0248061 A1 | 11/2005 | Shkolnik et al. | |
| 2005/0248062 A1 | 11/2005 | Shkolnik et al. | |
| 2006/0249884 A1 | 11/2006 | Partanen et al. | |
| 2007/0063389 A1 | 3/2007 | John | |
| 2007/0259066 A1 | 11/2007 | Sperry et al. | |

FOREIGN PATENT DOCUMENTS

| | | |
|---|---|---|
| DE | 10119817 A1 | 10/2002 |
| DE | 10256672 A1 | 6/2004 |
| EP | 549993 B2 | 3/1997 |
| EP | 676275 B1 | 7/2000 |
| EP | 1253002 A1 | 10/2002 |
| EP | 1439051 A2 | 7/2004 |
| EP | 1439052 A2 | 7/2004 |
| EP | 1274559 B1 | 2/2005 |
| EP | 1250997 B1 | 11/2005 |
| JP | 2002370286 A | 12/2002 |
| JP | 6039928 A | 12/2007 |

OTHER PUBLICATIONS

U.S. Appl. No. 11/856,405, filed Sep. 17, 2007.
U.S. Appl. No. 11/856,428, filed Sep. 17, 2007.
U.S. Appl. No. 11/856,172, filed Sep. 17, 2007.
U.S. Appl. No. 11/856,183, filed Sep. 17, 2007.
U.S. Appl. No. 11/856,225, filed Sep. 17, 2007.
U.S. Appl. No. 11/856,209, filed Sep. 17, 2007.
U.S. Appl. No. 11/856,241, filed Sep. 17, 2007.
U.S. Appl. No. 11/856,270, filed Sep. 17, 2007.
U.S. Appl. No. 11/856,455, filed Sep. 17, 2007.
European Search Report for App. No. EP 07251804 dated Jun. 29, 2009.
English Translation of DE 19957370A1, Jun. 13, 2001.

* cited by examiner

MATERIAL DELIVERY SYSTEM FOR USE IN SOLID IMAGING

FIELD OF INVENTION

The present invention is directed to forming cross-sectional layers with an image projection system using a solidifiable build material in an apparatus for forming three-dimensional objects on a layer-by-layer basis. More particularly, it is directed to a disposable cartridge dispenser and method for delivering to a radiation transparent endless belt a solidifiable liquid build material used to form the three-dimensional object being built in response to exposure by UV or visible radiation and removing unused solidifiable liquid build material from the endless belt after the exposure process and returning it to the cartridge dispenser for filtering and reuse.

BACKGROUND OF THE INVENTION

In recent years, many different techniques for the fast production of three-dimensional models have been developed for industrial use. These solid imaging techniques are sometimes referred to as rapid prototyping and manufacturing ("RP&M") techniques. In general, rapid prototyping and manufacturing techniques build three-dimensional objects layer-by-layer from a working medium utilizing a sliced data set representing cross-sections of the object to be formed. Typically, an object representation is initially provided by a Computer Aided Design (CAD) system.

Stereolithography, presently the most common RP&M technique, was the first commercially successful solid imaging technique to create three-dimensional objects from CAD data. Stereolithography may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) most often using a computer controlled laser beam of ultraviolet (UV) radiation into successive laminae according to the two-dimensional layer data. During transformation, the successive laminae are bonded to previously formed laminae to allow integral formation of the three-dimensional object. This is an additive process. More recent designs have employed the use of visible light to initiate the polymerization reaction to cure the photopolymer build material that is commonly referred to as resin.

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes. While stereolithography has shown itself to be an effective technique for forming three-dimensional objects, other solid imaging technologies have been developed over time to address the difficulties inherent in stereolithography and to provide other RP&M advantages.

These alternate technologies, along with stereolithography, have collectively been referred to as solid freeform fabrication or solid imaging techniques. They include laminated object manufacturing (LOM), laser sintering, fused deposition modeling (FDM), and various ink jet based systems to deliver either a liquid binder to a powder material or a build material that solidifies by temperature change or photocuring. Most recently a technology using digital light processing technology has employed visible light to initiate the photopolymerization reaction to cure a photopolymer build material, commonly referred to as a resin. Each of these additive technologies has brought various improvements in one or more of accuracy, building speed, material properties, reduced cost, and appearance of the build object.

All of the solid imaging or freeform fabrication techniques, to be successful, must form objects that are near full density or free of unintended voids or air pockets. Voids caused by air pockets create discontinuities and weaknesses in the objects being built, as well as not accurately reproducing the three-dimensional aspect of the object being created from the CAD representation. This problem is especially acute in technologies employing solidifiable liquid resin that is placed down layer-by-layer employing an intermediate transfer process. The use of an intermediate transfer surface from which the solidifable liquid resin is transferred to a support platform or an underlying layer of material reduces the amount of excess resin that must be removed from completed parts and eliminates the need to build in a vat or large container of resin. This does eliminate the cost of additional resin beyond what is necessary to build the then needed parts. However, it increases the need for reliable and consistent layer thickness in the transferred liquid resin and a reliable delivery system to deliver the solidifiable liquid resin to the endless belt used as the transfer surface as cross-sections of material are formed. Additionally, the use of an endless belt as the intermediate transfer surface creates the need to remove unused liquid resin from the belt prior to the subsequent recoating and selective imaging step.

Further, none of the prior solid freeform fabrication approaches, while making substantial improvements, have yet to achieve a truly low cost system that produces highly accurate and visually appealing three-dimensional objects in a short build time.

These problems are solved in the design of the present invention by employing a disposable solidifiable liquid build material or resin cartridge dispenser and design employable in a low cost solid imaging technique with the use of digital imaging projection or laser scanning in a manner that creates a three-dimensional object. The design and technique accurately reflect the CAD representation of the object to be formed while consistently applying uniform thicknesses of the solidifiable liquid resin used to form the three-dimensional object. The disposable solidifiable liquid resin cartridge dispenser is easily removable from the flexible transport imaging system.

SUMMARY OF THE INVENTION

It is an aspect of the present invention that a solid imaging apparatus is provided that utilizes a build material dispensing system employing a disposable build material cartridge dispenser that reliably dispenses a solidifiable liquid build material to a radiation transparent intermediate build material transfer surface to achieve high resolution imaging in three-dimensional objects built using UV radiation or visible light and a photopolymer build material:

It is another aspect of the present invention that the build material dispensing system removes unused liquid build material from the radiation transparent intermediate transfer surface and returns it to the disposable build material cartridge dispenser for reuse.

It is a feature of the present invention that an endless belt is employed as the radiation transparent intermediate transfer surface to receive a layer of solidifiable liquid build material from the disposable liquid build material cartridge dispenser and the solidifiable liquid build material is then transferred to a receiving substrate layer-by-layer and exposed to radiation to create a three-dimensional part.

It is another feature of the present invention that the solidifiable liquid build material is dispensed from a channel in the disposable liquid build material cartridge dispenser to the endless belt by means of a fluid wedge.

It is yet another feature of the present invention that the disposable liquid build material cartridge dispenser contains an internal supply reservoir from which the liquid build material is provided to a dispensing chamber from which the liquid build material is dispensed through the dispensing channel to the endless belt that is the radiation transparent intermediate transfer surface.

It is still another feature of the present invention that a pump is employed to deliver the liquid build material from the supply reservoir to the dispensing chamber from which the liquid build material is applied to the endless belt.

It is a further feature of the present invention that the disposable liquid build material cartridge dispenser includes a scraper surface to remove the unused liquid build material from the radiation transparent intermediate transfer surface and directs the removed unused liquid build material to a collection chamber.

It is yet a further feature of the present invention that the disposable liquid build material cartridge dispenser contains a filter to pass unused liquid build material from the collection chamber to the supply reservoir for reuse while retaining solid particles of build material and other matter in the collection chamber.

It is another feature of the present invention that the disposable liquid build material cartridge contains an overflow passage to return excess liquid build material from the dispensing chamber to the supply reservoir.

It is an advantage of the present invention that a low cost, disposable and easily removable liquid build material cartridge dispenser for use in a solid imaging device is obtained that reliably dispenses build material during the building of three-dimensional objects.

It is another advantage of the present invention that the liquid build material dispensing system recovers unused liquid build material for reuse in the building process, thereby minimizing waste.

It is a further advantage of the present invention that the build material dispensing system obviates the need for an open bath or vat of build material in the building process.

These and other aspects, features, and advantages are obtained by the present invention through the use of a solid imaging apparatus and method that employ a disposable liquid build material cartridge dispenser to move a liquid build material from a supply reservoir to a dispensing chamber to dispense liquid build material in a fluid wedge through a channel to an endless belt employed as a radiation transparent intermediate transfer surface and utilizes a scraper surface to remove unused liquid build material from the belt, filter and recycle the unused liquid build material as part of imaging process in which solidifiable liquid build material is applied to the belt and transferred to a receiving substrate layer-by-layer for exposure to create a three-dimensional object.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Flexible transport solid imaging of the type disclosed herein involves the layer-by-layer build-up of articles from a solidifiable liquid build material that is a visible or UV radiation curable liquid photopolymer material. The liquid photopolymer material is delivered by a radiation transparent flexible transport endless belt or reciprocatable sheet of film. Liquid photopolymer material is applied to the endless belt or reciprocatable sheet of film from a disposable feed cartridge of the present invention employing an appropriate coating device such as a gravure wheel or fluid wedge that transfers the photopolymer build material to the intermediate transfer flexible transport surface to provide a fresh material to create new layers as the three-dimensional object is built. The photopolymer build material is transferred from this flexible intermediate transfer surface via transfer means to a receiving substrate without entrapping air bubbles in the transferred layers. The photopolymer build material is imaged by radiation projected from either a digital UV projector or a digital visible light projector and solidified layer-by-layer. The projector includes a spatial light modulator, such as a digital micro-mirror device ("DMD") that selectively illuminates pixels for imaging. Visible light projection is a preferred approach.

Solid imaged parts are preferably built on an elevator platform that moves the build object or part into contact with the liquid photopolymer build material and, after exposure, out of contact with the liquid photopolymer build material as successive layers or laminae are formed during the building process. The build object can be built on structures known as supports rather than directly on the elevator platform. Supports are used for more complex three-dimensional objects being built that have unsupported or partially unsupported surfaces.

Commercially available digital light projectors, optionally modified to have a shorter focal length, may be employed, such as those available from InFocus Corporation of Wilsonville, Oreg., BenQ America Corp. of Irvine, Calif. or Optima Corporation of Taiwan.

In one application of the present invention, the solidifiable liquid photopolymer build material is delivered to the imaging area via a radiation transparent flexible build material carrier film, such as polypropylene or polycarbonate. The photopolymer build material is applied in a thin layer to the flexible transport film in the embodiment shown in FIG. 1.

Figure 1:
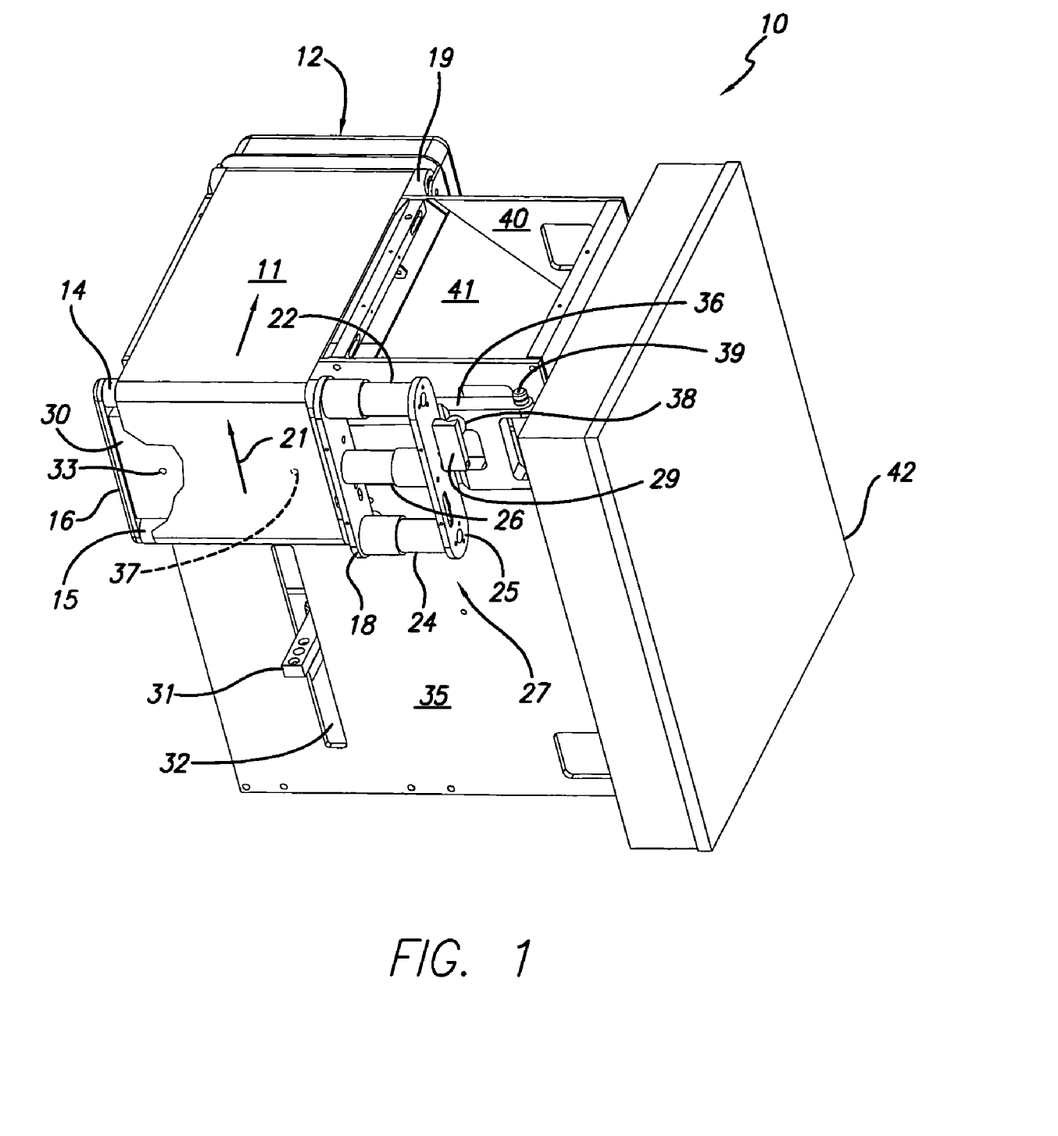
FIG. 1 is a front perspective view of a flexible transport solid imaging system, with its covers removed, utilizing an endless flexible belt as the build material carrier means and employing a tracking and tensioning apparatus.

As seen in FIG. 1, a flexible transport imaging system with covers (including cover 42) removed is indicated generally by the numeral 10. Flexible transport imaging system 10 has a radiation transparent build material intermediate transfer surface or carrier in the form of an endless belt 11 that is positioned about drive rollers 14 and 15 and follower or idler rollers 19 and 20. A build material feed cartridge assembly is indicated generally by the numeral 12. The cartridge assembly 12 and the idler rollers 14 and 15 are fixed in their relative positions. Belt 11 is driven in the direction indicated by arrow 21 by electrical drive motors 22 and 24 that drive rollers 14 and 15, respectively. The vertical distance between drive rollers 14 and 15 is fixed, but the horizontal distance between the drive rollers 14 and 15 and idler rollers 19 and 20 is variable to control the tension in endless belt 11. Idler rollers 19 and 20 are rotatably mounted between vertical frame members 35 and 40.

A digital light projector (not shown) is the radiation source that projects an image with selected pixels for illumination onto a mirror system 41 of FIG. 1 below the upper run of endless belt 11 in the exposure of a cross-section of a three-dimensional object being formed on a support platform (not shown). The support platform is raised and lowered by a pair of stepper motors (also not shown) that ride up a threaded lead screw and guide rails on opposing sides of the imaging system 10. The guide rails are held in place by guide rail anchor plates (all not shown) appropriately fastened to the system frame. A support platform assembly bar 31 is fastened to each stepper motor. As best seen in FIG. 1, support platform assembly bar 31 extends through slot 32 in frame end plate 35 and a corresponding slot in an opposing end frame, both not shown, on the opposing side of the system 10. This enables the support platform assembly bar 31 to move with the stepper motors to raise and lower the support platform. This brings the already formed cross-sectional layers into contact with the layer of resin or solidifiable liquid build material 47 that is deposited on endless belt 11 by a build material feed cartridge assembly 12 through a dispensing slit or channel, as will be described hereinafter.

The build material feed cartridge assembly 12 is a disposable cartridge dispenser that is an integral part of the flexible transport solid imaging system 10. The disposable cartridge dispenser both coats the belt 11 with solidifiable liquid build material and removes unused liquid build material from it. The cartridge dispenser also contains a filtering device that cleans the removed unused liquid build material by separating out solid particulates before returning it to a supply reservoir.

Figure 2:
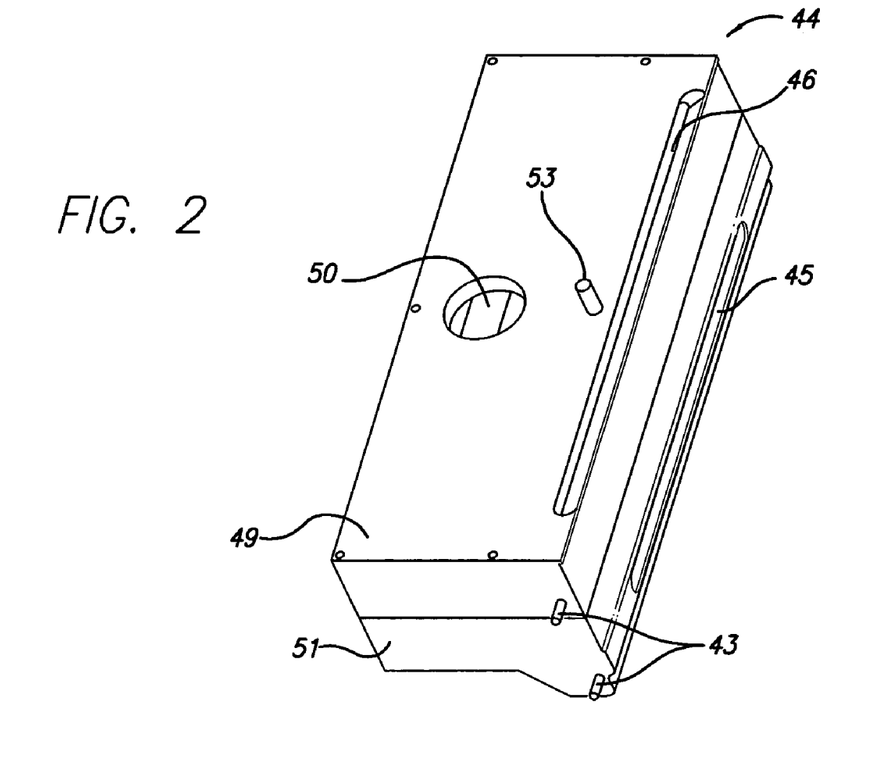
FIG. 2 is an isometric view of one embodiment of a build material cartridge dispenser used in a flexible transport solid imaging system.

One embodiment of the build material feed cartridge assembly 12 is shown in FIG. 2 as disposable cartridge dispenser 44. Cartridge dispenser 44 includes a resin supply reservoir 48 of solidifiable liquid material 47 and a dispensing slit or channel 45 through which the solidifiable liquid build material 47 is applied to belt 11. The dispensing channel 45 is an elongated narrow opening and spans almost the entire width of the front of the disposable cartridge dispenser 44, but it also could be a series of holes of any suitable geometric shape, such as a circle, square, rectangle or triangle, or a single opening of other suitable shape, such as an ellipsoid or rectangle, dependent upon the pattern and volume of liquid build material to be dispensed. The length and height of the opening formed by the dispensing channel 45 is dependent upon the volume of liquid build material to be dispensed over a desired area. Disposable cartridge dispenser 44 contains a fluid flow control device in the form of a 3-position valve 52 that can be closed, partially open to remove material from the belt, or fully open to both coat and remove.

FIG. 2 is an isometric view of the assembled cartridge dispenser 44. It consists of a top section 49 and a bottom section 51 which are secured together with a seal (not shown) between the sections. A hole 50 in the top section 49 is used to fill the cartridge dispenser 44 with solidifiable liquid build material 47 and is then sealed. Pins 43 are located on both ends of the cartridge and are used to removably secure the cartridge dispenser to the flexible transport solid imager. The dispensing channel 45 and scraper recovery channel 46 are passageways to the liquid build material supply reservoir 48, and are controlled by the internal slide valve 52 of FIG. 3, which is actuated by plunger 53.

Figure 3:
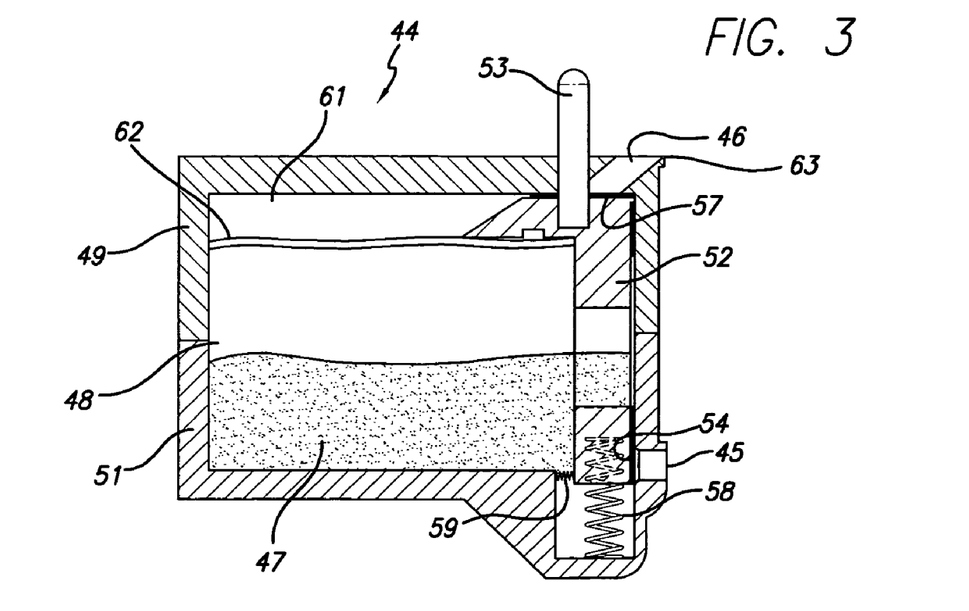
FIG. 3 is a side sectional view of the a build material cartridge dispenser of FIG. 2 showing the solidifiable liquid build material in the build material feed cartridge.

FIG. 3 shows a cross-sectional side view of the solidifiable liquid material cartridge dispenser 44 with valve 52 in the closed position. This is the default position of valve 52. Valve 52 is in this position during shipping and storage of the cartridge dispenser, as well as when the flexible transport solid imager 10 is not in use. FIG. 3 shows the top section 49 and bottom 50 section, as well as the dispensing channel 45 and scraper recovery channel 46. The valve plunger 53 actuates the slide valve 52. The cartridge dispenser supply reservoir 48 contains the solidifiable liquid build material 47.

Figure 4:
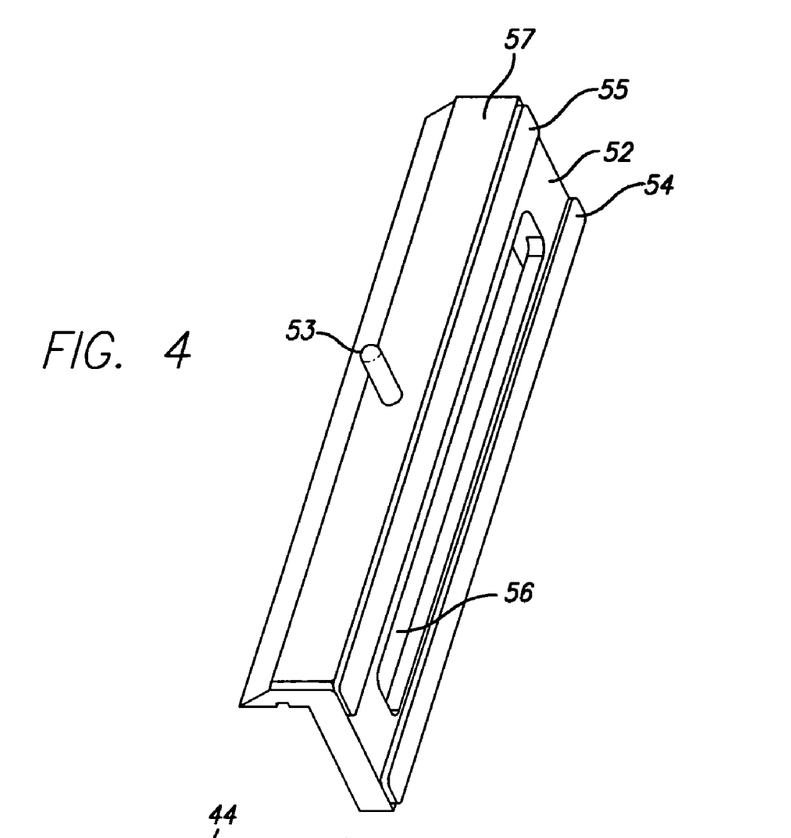
FIG. 4 is an isometric view of the front plate of the a build material cartridge dispenser of FIG. 2 with the dispensing channel through which the liquid build material is dispensed.

FIG. 4 shows an isometric view of the slide valve 52 with its actuation plunger 53. Attached to valve 52 are two forward facing attached sealing surfaces 54, 55 for valve 52, with the lower one 54 also acting as a seal to prevent the flow of build material through the dispensing channel 45. The top forward facing seal 55, along with top seal 57, prevents the flow of liquid build material through the scraper recovery channel 46.

A supply channel 56 passes through the front of the slide valve 52. Top forward facing seal 55 prevents liquid build material from rising upwardly into the scraper recovery channel 46.

As seen in FIG. 3, the slide valve 52 is in the closed position. The plunger 53 also acts as an upper guide for the slide valve 52 due to its close fit through the hole in the top section 49 of cartridge dispenser 44. At either end, or preferably on opposing sides, of the slide valve 52, spring 58 biases the valve 52 towards its upper, closed position. Another spring 59 provides a biasing force to keep the forward edge of slide valve in intimate contact with the inner face of the cartridge dispenser housing to effect a tight seal. In this closed position, it can be seen that the lower seal 54 covers the dispensing channel 45, and the top seal 57 covers the scraper recovery channel 46 while upper seal 55 sealingly seats against the interior housing of dispenser top section 49. The solidifiable liquid build material 47 is now prevented from flowing out through either of these channels and recovered unused liquid build material cannot enter via scraper recovery channel 46.

Figure 5:
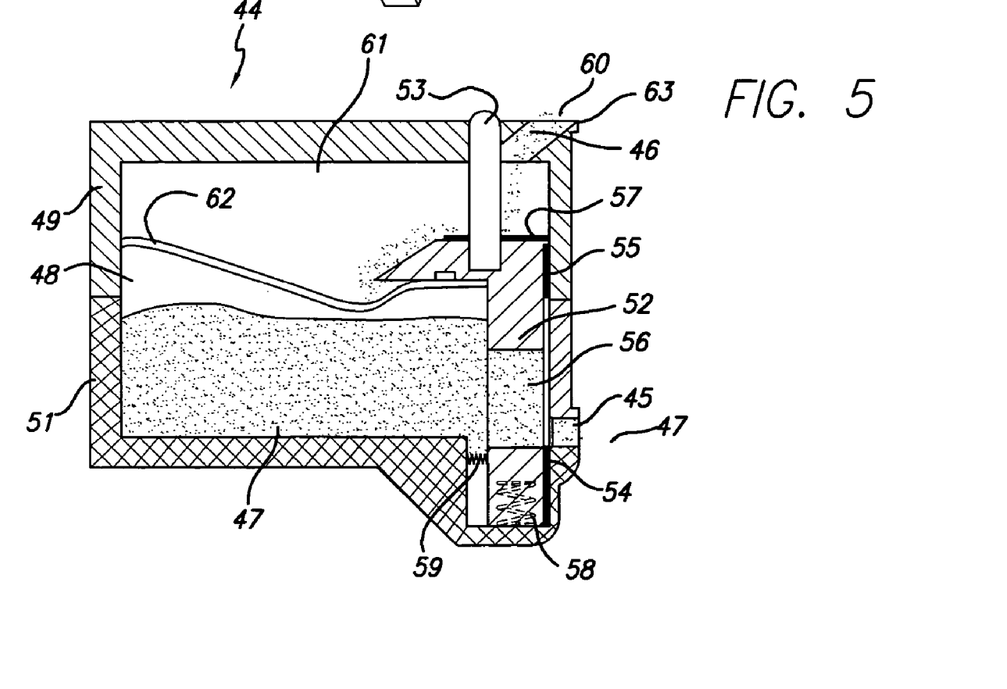
FIG. 5 is a diagrammatic cross-sectional illustration view of the build material cartridge dispenser dispensing liquid solidifiable build material through the dispensing channel and recovering unused liquid build material in a collection chamber via the scraper.

FIG. 5 is a cross-sectional view of the cartridge dispenser 44 with the slide valve 52 in the fully open, or build position. Valve 52 is in this position during the building operation. In this position, the solidifiable liquid build material 47 is allowed to flow out of the dispensing channel 45 to coat the endless belt 11, see briefly FIG. 1, while simultaneously scraping the unused liquid build material 60 from the belt 11 just prior to the belt moving past the dispensing channel 45 where a fresh layer of solidifiable liquid build material 47 is applied to recoat the belt 11 of FIG. 1 for the next imaging cycle. The unused liquid build material 60 returns to the cartridge collection reservoir 61 where it is in fluid flow communication with the liquid build material supply reservoir 48 via a filter 62. The unused liquid build material 60 is strained through filter 62 and then returned to the liquid build material supply reservoir 48 for reuse. The unused liquid build material 60 on the belt 11 is the portion of the photocurable material applied to the belt 11 which is not exposed and solidified by the image-wise radiation projected from the digital light projector during the imaging. Solid particulate matter is retained by the filter 62 and prevented from entering the supply reservoir 48. During operation, the sharp scraping edge 63 adjacent the top and front of cartridge 44 scrapes the surface of belt 11 as the belt travels over the edge 63 to remove the unused liquid build material.

In this fully open position shown in FIG. 5 the plunger 53 is pressed to its lowest position by an external actuator (not shown) that is part of the flexible transport imaging system 10. The slide valve 52 travels to its lowest position, compressing the spring 58. The lower seal 54 is now below the dispensing channel 45, exposing the liquid build material 47 to the supply channel 56 in the valve 52, and thereby allowing the solidifiable liquid build material 47 to flow to and out of the dispensing channel 45. In this position the upper seal 55 opens the scraper recovery channel 46 which allows the unused liquid build material 60 to reenter the cartridge dispenser 44, passing through the filter 62 and returning to the supply reservoir 48 for reuse.

Figure 6:
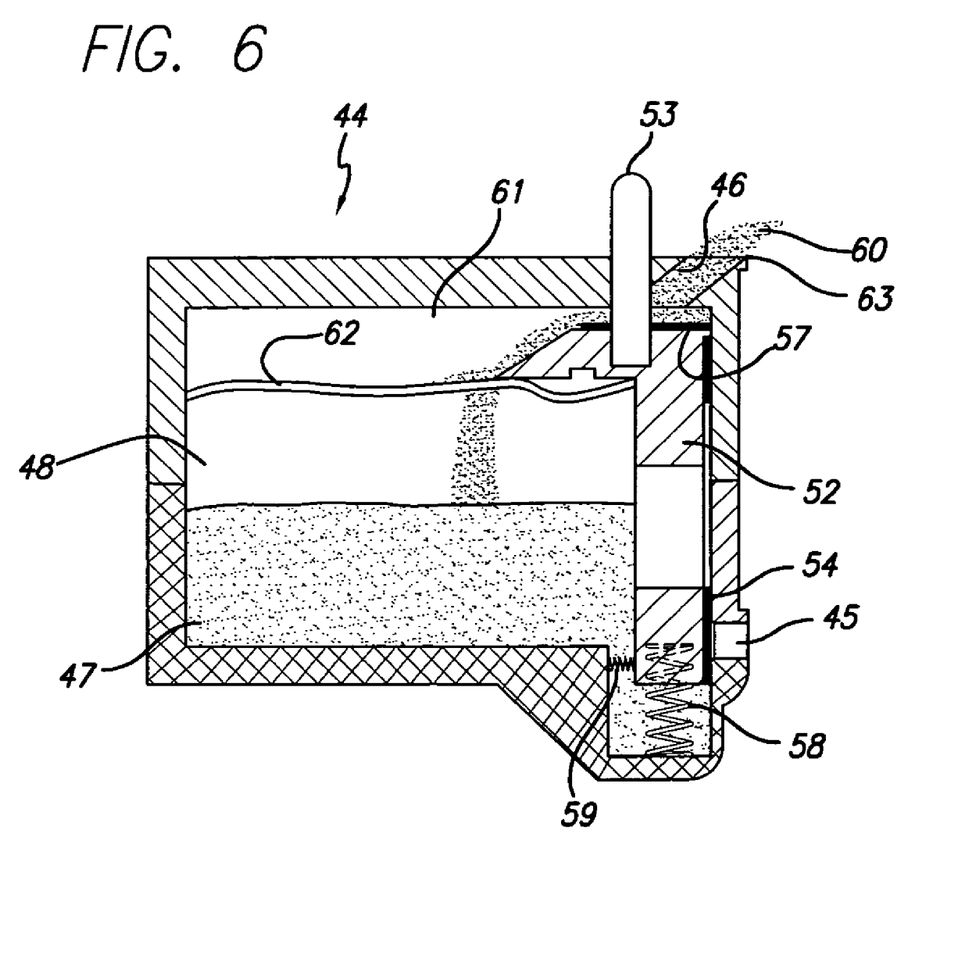
FIG. 6 is a diagrammatic cross-sectional illustration view of the build material cartridge dispenser with the dispensing valving closed, thereby retaining the liquid solidifiable build material in the cartridge reservoir and the recovery valving open to direct recovered unused liquid build material into the collection chamber.

FIG. 6 shows the disposable cartridge dispenser 44 with the valve 52 in an intermediate position, where the external actuator has pressed the plunger 53 only partially downward. This position is used for cleaning the belt 11, but not for recoating it with fresh liquid build material 47. This is useful to remove unused liquid build material 60 from the belt 11 at the end of a build, or when the flexible transport imaging system needs to stop or pause. The lower seal 54 covers the dispensing channel 45, preventing the flow of liquid build material 47 out of the cartridge dispenser 44. The upper seal 57, however, is now clear of the scraper recovery channel 46 which, as in the build position, collects the unused build material 60 by the action of the scraper edge 63 against the belt 11, cleaning the belt. This also allows the unused liquid build material 60 to reenter the cartridge dispenser 44 via the scraper recovery channel 46 and collection reservoir 61, pass through the filter 62 and return to the liquid build material supply reservoir 48.

Figure 7:
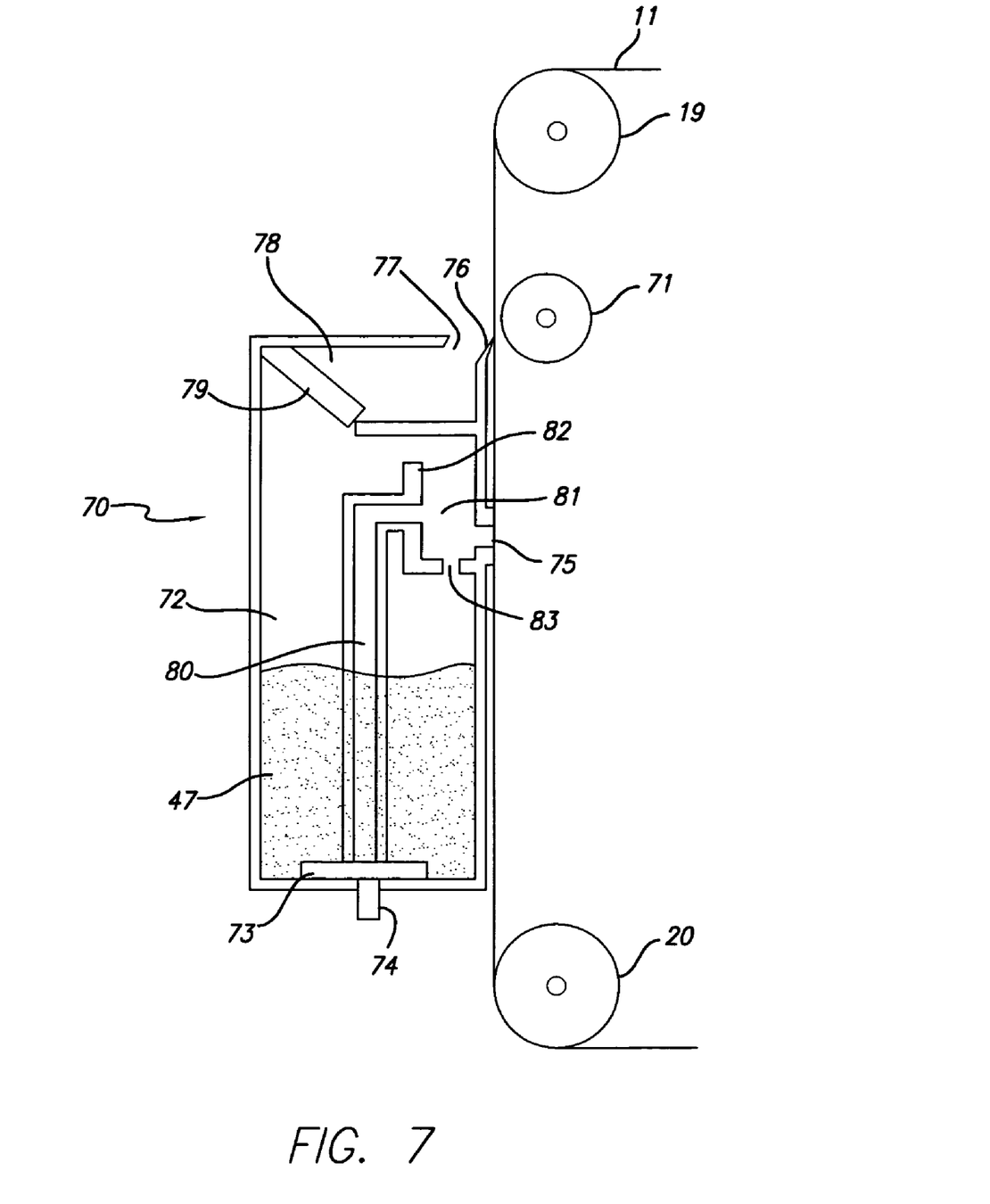
FIG. 7 is a diagrammatic illustration of a side elevational view of another embodiment of a disposable build material cartridge dispenser in contact with the endless belt as the build material intermediate transfer surface containing liquid build material in the reservoir chamber in preparation for delivering the liquid build material to the dispensing chamber by means of a pump.

FIG. 7 shows an alternate and more preferred embodiment of a disposable cartridge dispenser 70 employed as the build material feed cartridge assembly 12. FIG. 7 is a diagrammatic illustration of the liquid build material dispenser cartridge, indicated generally by the numeral 70, as well as the belt 11, idler drive rollers 19, 20 and auxiliary roller 71. Inside the disposable cartridge dispenser 70 is a supply of solidifiable liquid build material 47. A pump 73, such as an air operated silicone diaphragm pump or a peristaltic pump, is part of the cartridge dispenser 70. An appropriate coupling 74 connects to a controlled air supply (not shown) that is part of the flexible transport imaging system 10. The cartridge dispenser 70 also contains dispensing opening or channel 75, a scraper edge 76, a scraper recovery channel 77, a collection reservoir 78, and a material filter 79. The dispensing channel 75 is an elongated narrow opening. As described earlier, the dispensing channel 75 also could be a series of holes of any suitable geometric shape, such as a circle, square, rectangle or triangle, or a single opening of other suitable shape, such as an ellipsoid or rectangle, dependent upon the pattern and volume of liquid build material to be dispensed. The length and height of the opening formed by the dispensing channel 75 is dependent upon the volume of liquid build material to be dispensed over a desired area. Solidiflable liquid build material is pumped up to the chamber 81 and dispensing channel 75 through conduit 80.

Figure 8:
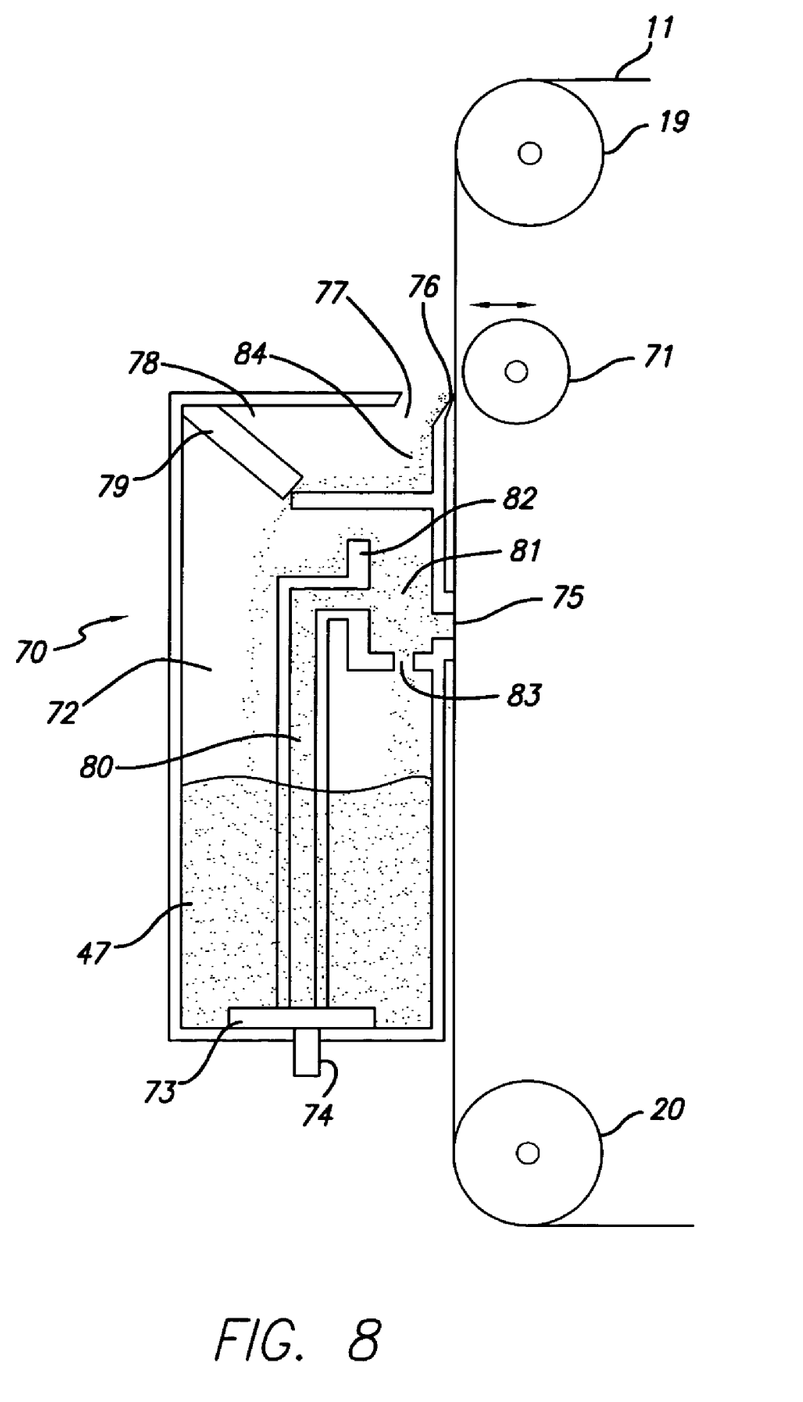
FIG. 8 is a diagrammatic illustration of a side elevational view of the disposable build material cartridge dispenser of FIG. 7 delivering liquid build material to the dispensing chamber by means of a pump, with excess liquid build material being returned via an overflow channel to the supply reservoir and unused liquid build material being removed from the endless belt surface, filtered and returned to the supply reservoir.

As seen in FIG. 8, the pump 73 has been activated. Solidifiable liquid build material 47 is pumped from the supply reservoir 72, through a conduit 80 and into a chamber 81 that supplies the dispensing channel 75 and coats the belt 11 as the belt 11 is driven downwardly past the dispensing channel 75. At the top of chamber 81 is a dam 82, above which is open to the interior of cartridge dispenser 70 and the solidifiable liquid build material supply reservoir 72. Any liquid build material 47 above the level of this open topped dam 82 spills over and returns to the supply reservoir 72. In this manner, the level of solidifiable liquid build material 47 in the reservoir is replenished and through the pump 73, a constant head pressure is maintained at the dispensing channel 75, resulting in a fluid wedge and even coating of the belt 11. At the bottom of chamber 81 are one or more small drain holes 83 that allow solidifiable liquid build material 47 to constantly drain back into the supply reservoir 72. In the event of a power failure, or any time the flexible transport imaging system stops, all of the liquid build material 47 in chamber 81 will drain back into the supply reservoir 72, and the disposable cartridge dispenser 70, or belt 11, can be removed without spilling liquid build material. The pump 73 is designed with sufficient capacity to keep the chamber 81 filled and overflow dam 82 during operation of the system even with the drain holes 83, thereby achieving a constant pressure, fail-safe supply system.

Also shown in FIGS. 7 and 8 is an auxiliary roller 71 that can be included to apply additional force to the junction between the belt 11 and scraper edge 76. Auxiliary roller 71 can be a silicone coated roller or other appropriate contact surface that directs the belt 11 into contact with the scraper edge 76 to achieve more complete cleaning than can be accomplished by belt tension alone. Auxiliary roller 71 can be mounted for lateral movement to adjust the pressure exerted by the contact surface of the scraper edge 76 against the belt 11 as needed. The recovered unused liquid build material, seen as 84 in FIG. 8, returns to cartridge dispenser 70 through scraper recovery channel 77 into collection reservoir 78, from which it passes through the filter 79 enroute to returning to the supply reservoir 72.

Figure 9:
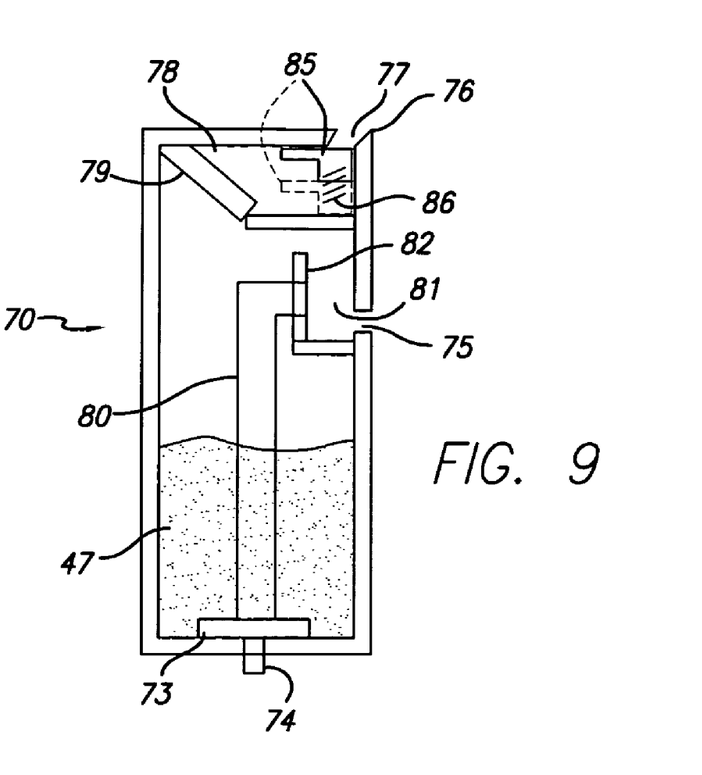
FIG. 9 is a diagrammatic illustration of a side elevational view of the disposable build material cartridge dispenser of FIG. 7 showing an embodiment utilizing a valve movable between an open and a closed position to control the flow of unused liquid build material through the scraper channel.

Referring to FIG. 9, a slide valve 85 loaded with one or more springs 86 can be included in cartridge dispenser 70 to normally close off the scraper recovery channel 77 to prevent liquid build material from escaping when the cartridge dispenser 70 is not installed in the flexible transport imaging system. When the cartridge dispenser 70 is installed, a passive mechanism such as a pin or lever (not shown) in the imaging system pushes the slide down, compressing the springs 86 and opening the slide valve 85, shown in dotted lines, for use. A similar mechanism also can be used to close off the dispensing channel 75.

Figure 10:
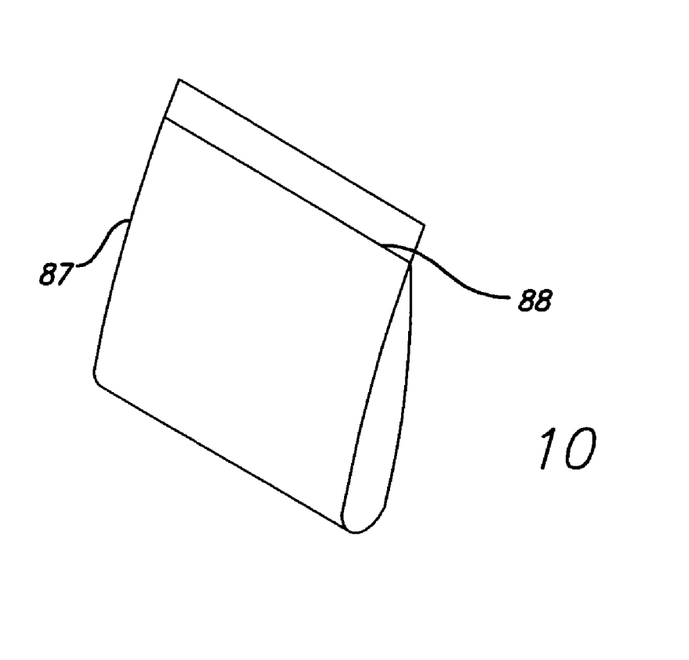
FIG. 10 is a front perspective view of a sealed liquid build material pouch container.

Prior to manufacture of the cartridge dispenser 70, a predetermined amount of solidifiable liquid build material 47 may be dispensed into a plastic pouch, indicated generally by the numeral 87 in FIG. 10. The pouch 87 is sealed at seal joint 88 by heat or other appropriate means to make a leak proof package.

Figure 11:
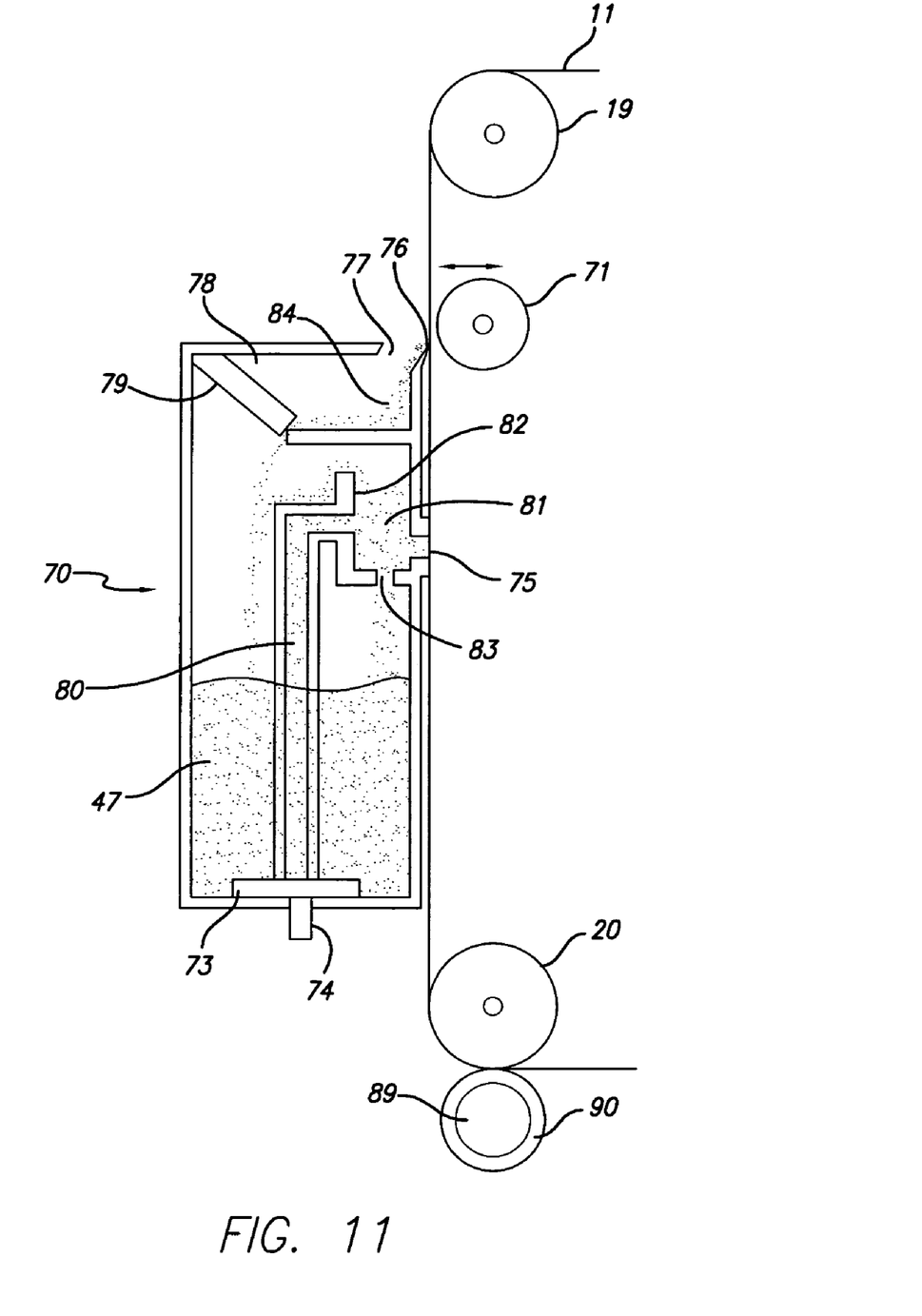
FIG. 11 is a diagrammatic illustration of a side elevational view of the disposable build material cartridge dispenser of FIG. 7 with a dispersing roller to remove air bubbles entrapped in the liquid build material that is metered onto the endless belt via the dispensing channel by pressing the liquid build material on the endless belt against a guide roller.

FIG. 11 shows a diagrammatic illustration of the cartridge dispenser 70 as previously described, but with the addition of a dispersing roller 89 downstream of the dispensing channel 75. In the cartridge dispenser 70 as described, unused liquid build material 84 is removed from the previously coated belt 11 by a scraper edge 76 and returned to the cartridge dispenser 70 via the scraper recovery channel 77. During this scraping procedure, air is entrapped in the unused liquid build material 84. As the unused liquid build material 84 is recirculated through the cartridge, the entrapped air is also circulated, so that as the solidifiable liquid build material 47 is metered onto the belt 11 by the dispensing channel 75, the air in the form of bubbles cause voids and streaks in the coating of liquid build material coating on the belt 11, resulting in voids in the final part formed by the layer-wise repetitive exposure of build material 47.

The dispersing roller 89 is placed adjacent to the lower idler roller 20 in such a way that the belt 11 is driven between the rollers, with the dispersing roller 89 on the side of the belt 11 that is coated with the liquid build material 47. As the belt 11 is driven, the dispersing roller 89 redistributes the liquid build material 47 on the belt 11. In doing this, entrapped air is removed or expressed out of the liquid build material 47, resulting in a void-free coating. As previously described, the coating of solidifiable liquid build material 47 is applied to the belt 11 at a metered rate by the dispensing channel 75. The dispersing roller 89 then redistributes the coating of solidifiable liquid build material 47 without air and, as an added advantage, aids in smoothing any inconsistencies in the coating thickness in both the longitudinal and latitudinal directions.

In the preferred embodiment, the dispersing roller 89 has an outer coating 90 made from a soft elastomeric material, such as silicone, and is influenced against the drive roller with a spring load (not shown). In practice, other suitable materials and appropriate biasing methods can also be employed.

When the cartridge dispenser 70 is assembled, and a plastic pouch is utilized, the sealed plastic pouch 87 is placed into it. In this manner, the build material feed cartridge assembly is leak proof during shipping and storage. Included in the bottom of the cartridge dispenser 70 is a slidable blade (not shown) or other appropriate device that has the ability to slice the plastic pouch 87 and release the solidifiable liquid build material 47 into the supply reservoir 72. Attached to the blade is ribbon (also not shown) or similar device that extends through the wall of the cartridge dispenser housing to the outside, preferably routed around and out of the upper surface of the cartridge dispenser. When the disposable cartridge dispenser is to be placed into service, the ribbon is pulled by the installer, which in turn pulls the slidable blade, cutting the plastic and releasing the solidifiable liquid build material 47 into the supply reservoir 72 of the cartridge dispenser 70. The cartridge dispenser is now ready to use.

Returning now to FIG. 1, the drive roller carriage 27 and part of the belt tracking and tensioning system of the flexible transport imaging system 10 are also shown. The drive roller carriage 27 and belt tracking and tensioning system are described in greater detail in U.S. Patent Application Publication Number 2007,0259066. Drive rollers 14 and 15 are rotatably mounted between vertical frame members 16 and 18. Drive motors 22 and 24 are mounted to vertical frame member 18 and are drivingly connected to drive rollers 14 and 15. Drive roller vertical frame member 25 is attached to the end of the drive motors. Belt tracking motor 26 controls the tracking of belt 1 as it rotates about rollers 14, 15, 19 and 20 and faces in the opposite direction of drive motors 22 and 24. A motor shaft extends through frame member 25 from motor 26. A belt tracking control arm 29 is attached to the end of the motor shaft. A tracking control arm frame member 30 connects frame members 16 and 18 and includes a pivot attachment that is used to mount the drive roller carriage. A left edge belt tracking optical sensor 33 and a right edge belt tracking optical sensor 37 are mounted to frame member 30 as seen in FIG. 1.

Drive roller 14, idler roller 19 and endless belt 11 are shown, along with vertical frame members 16, 18 and 25. A mounting arm 36 is attached between a pivot attachment (not shown) on the drive roller carriage and the pivot 39 on the frame end plate 35. The entire drive roller carriage moves about pivot 39 that extends the distance between drive rollers 14 and 15 and idler rollers 19 and 20, thereby putting tension on the endless belt 11 when an air cylinder plunger (not shown) is extended or reducing tension when it is retracted. The pivot point on the pivot attachment is offset a small distance from the center of the pivot attachment. The air cylinder (not shown) mounts through end plate 35 so the cylinder plunger contacts the back of the pivot attachment on the back of tracking control arm frame member 30. When the air cylinder is pressurized, its plunger exerts a force on the drive roller carriage via the pivot attachment. A desired tension can thus be maintained on the endless belt 11.

The tension in the belt 11 controls the thickness of the solidifiable liquid build material 47 applied to the endless belt 11 as the belt 11 travels vertically downwardly across the dispensing slit or channel 45 or 75 in build material cartridge dispenser 44 or 70, respectively, as seen in FIGS. 5 and 8. The dispensing slit or channel in each embodiment supplies liquid build material from the supply reservoir within cartridge dispenser 44 or 70 to the surface of the endless belt 11. The cartridge dispenser 44 or 70 can have a flat section above and below the dispensing channel 45 or 75, respectively, and an arcuate section with large radius at the bottom to provide clearance for the build material 47 on the coated surface of belt 11 as the belt is driven in its path about rollers 14, 15, 19 and 20. Alternatively, the bottom section can be at an acute angle or a right angle to provide the required clearance. As belt 11 moves past channel 45 or 75, a fluid wedge develops at the bottom edge of the channel that applies an even coating onto the belt 11 via the fluid wedge effect so that the greater the tension in the belt 11, the thinner is the coating.

The coating thickness is monitored by an appropriate sensor, such as a pattern recognition device. If the coating thickness is too thick, the air cylinder plunger will slowly be extended so as to increase the tension in belt 11 and decrease the fluid wedge, thereby making the coating thinner until the correct thickness coating is obtained. Alternately, if the coating is too thin, the plunger will be retracted, decreasing the belt 11 tension and thereby increasing the fluid wedge making the coating thicker until the desired thickness is obtained. The coating thickness can be controlled to 0.002 inches for faster imaging or to 0.001 inches for slower imaging. The air cylinder can exert between 10 to 20 pounds per square inch against the belt 11 to ensure the belt is taut about rollers 14, 15, 19 and 20. Any other effective device can be used to exert pressure on the belt 11, such as a solenoid valve, air cylinder, spring or other appropriate mechanical system. The fluid wedge can be effectively created whether there is an angled bottom edge or a straight or rounded bottom surface to the dispensing channel 45 or 75. The effectiveness of the fluid wedge is a function of a number of factors including the viscosity of the solidifiable liquid build material 47, the surface tension between the build material 47 and the belt 11, the pressure head of liquid build material 47 in the disposable cartridge dispenser, the height of the opening of the dispensing channel 45 or 75, the length of the flat sections above and below the dispensing channel, and the speed and tension of the belt 11 as it traverses about roller 14, 15, 19, and 20 and past channel 50.

As illustrated in FIG. 1, belt tracking motor 26 exerts a rotational force on tracking control arm 29. The control arm 29 is attached to mounting arm 36 via a magnetic ball 38 or any other linkage suitable to pivot the drive roller carriage. The magnetic ball 38 rests in a slot in the control arm 29 and a countersink in a mounting arm so that if motor 22 exerts a clockwise rotational force, the control arm 29 pushes the magnetic ball into the mounting arm, forcing the drive roller carriage away from the mounting arm. Conversely, if the motor 22 exerts a counterclockwise rotational force, the control arm moves away from the mounting arm and the magnetic force pulls the carriage toward the mount. This rotates the drive roller carriage about a pivot point 39. Thus, the drive rollers 14 and 15 rotate to steer the belt 11. As seen in FIG. 1, if the drive roller carriage rotates clockwise, the belt 11 steers to the left, and with a counter clockwise rotation, it steers to the right. Tracking sensors 33 and 37 are placed apart at a distance so the width of the belt 11 just extends over the edges of the sensors 33 and 37, respectively. Sensors 33 and 37 are optical sensors that sense the presence of the belt 11. In operation, as the belt 11 is being driven it will translate laterally until it uncovers one of the sensors 33 or 37. The force on the tracking motor 22 will then be reversed and the belt 11 will translate until the other sensor is uncovered, and the process will reverse again. In this manner, the belt 11 is constantly moving laterally back and forth across a small distance.

An appropriate sub-pixel image displacement device, not shown, is placed between the radiation light source and the target area on the belt 11 that is coated with the solidifiable liquid build material 47. The exposure of the image cross-section by illuminating selected pixels creates a solidified portion of the cross-section of the three-dimensional object being formed. The sub-pixel image displacement device alternatively can be a mirror with the pixel shifting device being located outside of the runs of the endless belt 11 or it could combine both a mirror and pixel shifting device in a single element.

Any suitable liquid build material capable of solidification in response to the application of an appropriate form of energy stimulation may be employed in the practice of the present invention. Many liquid state chemicals are known which can be induced to change to solid state polymer plastic by irradiation with UV radiation or visible light. A suitable visible light curable photopolymer that may be employed in the practice of the present invention is shown in Table I below. This formulation exhibited excellent resolution and photospeed when utilized with a BenQ PB7220 projector. The parts created displayed outstanding green strength with balanced stiffness and toughness.

TABLE 1

|  | Units of Weight | Weight Percent |
|---|---|---|
| Acrylate-24 (from Sartomer Company) |  | % |
| PRO 6817 (from Sartomer Company) | 4.8 | 23.02 |
| SR 833S (from Sartomer Company) | 3.5 | 16.79 |
| Ebecryl 83 (from UCB Chemicals Corp.) | 2.4 | 11.51 |
| PRO 6169 (from Sartomer Company) | 5.2 | 24.94 |
| SR 531 (from Sartomer Company) | 3.6 | 17.27 |
| Irgacure I-907 (From Ciba Specialty Chemicals, Inc.) | 0.75 | 3.60 |
| Irgacure I-819 (From Ciba Specialty Chemicals, Inc.) | 0.6 | 2.88 |
| Total | 20.85 | 100.00 |

Additives can be incorporated into the formulation to promote release ability from the transparent transport means, such as silicone acrylate materials.

In operation, data to build a three-dimensional object is sent to the flexible transport solid imaging system from a CAD station (not shown) that converts the CAD data to a suitable digital layer data format and feeds it to a computer control system (also not shown) where the object data is manipulated to optimize the data via an algorithm to provide on/off instructions for the digital light projector. The solid imaging layer data is attained by the CAD data being processed by a slicing program to create cross-sectional data. An algorithm is then applied to the cross-sectional data by a suitable controller, such as a microprocessor or computer, to create the instructions for the digital light projector to illuminate selected pixels in the image within the boundary of the three-dimensional object in the cross-section being formed. An appropriate pixel shifting image displacement device can be employed to increase the resolution and edge smoothness of the cross-sections produced. Liquid build material 47 is moved from the supply reservoir in the disposable liquid cartridge dispenser 44 and 70 to the dispensing channel and applied to the belt 11.

Upon completion of the imaging of a layer, the support platform is lowered. Since the cured image is now stuck to both the belt 11 and support platform, the belt 11 is pulled downward by a suitable technique with the platform until the part layer peels from the belt 11. The belt 11 then returns back into its straightened form. The radiation transparent belt 11 carrying the liquid build material 47 peels away from the exposed and solidified layer of build material forming the cross-section of the three-dimensional part being formed with no horizontal motion therebetween. The flexibility of the radiation transparent belt 11 enables the separation to occur in a peeling type of action because the separation force is proportional to the width of the exposed area of the build material 47 as opposed to the total area of the exposed build material, as occurs in the case of an inflexible planar surface. Unused liquid build material travels on the belt 11 along its path of travel back past the disposable liquid build material dispenser 44 and 70 where the scraper edge 63 and 76 removes and directs the unused liquid build material 60 and 84 back into the cartridge collection reservoir 61 and 78. After passing through the filter 62 and 79 to separate out solid particulate matter, the unused liquid build material 60 and 84 passes into the solidifiable liquid build material reservoir 48 and 72 and is ready for reuse and dispensing onto the radiation transparent belt 11.

The substrate on which the part is built on the build support platform is chosen so that the part's bond to it is stronger than its bond to the belt 11. The substrate material should be pervious, flexible, and easily attachable to the build support platform. It can be a fine sandpaper or similar material to give grip, but more preferably is a porous material, such as ground silicone, that allows any wet, uncured material to flow away from the part to keep the part as dry as possible.

As the part grows, each new layer bonds to the cured build material of the layer below it. Once the platform is in its lowest position, the belt is driven in direction of travel 21 to re-coat the belt 11 with the build material 47. The belt 11 will be driven approximately 12" to 18" to establish a consistent layer thickness of the build material. The build support platform is then raised into position. Since there is now a 0.001" thick slice of the part on the build support platform, the build support platform is raised into a position 0.001" lower than the previous one so that it is now the top of the part that is in intimate contact with the coating of build material 47 on the surface 51 of the belt 11. In practice, this positioning is controlled by the stepper motors that raise and lower the build support platform in a manner that is very accurate in its movement and repeatable. If, for example, the stepper motors move the platform down 0.500" after each exposure, but move up only 0.499", they will always compensate for the 0.001" buildup per cycle. Now that the belt 11 has been re-coated and the build support platform is in position, the next slice of the part is projected, and the process continues until the part is complete.

While the invention has been described above with references to specific embodiments thereof, it is apparent that many changes, modifications and variations in the materials, arrangements of parts and steps can be made without departing from the inventive concept disclosed herein. For example, the build process and apparatus can be inverted so that the build support platform moves from the top downwardly into contact with the endless belt by the stepper motors and the part is built in an inverted position.

Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A disposable liquid feed material cartridge for use in an apparatus for forming a three-dimensional object layer-by-layer by solid imaging comprising in combination:
   a. a housing having a top, a bottom, a first side and an opposing second side;
   b. a solidifiable liquid build material supply reservoir within the housing;
   c. a dispensing opening in the first side in fluid flow communication with the solidifiable liquid build material supply reservoir effective to feed liquid build material out of the feed material cartridge;
   d. a fluid flow control device effective to selectively control the flow of the solidifiable liquid build material from the solidifiable liquid build material supply reservoir to the dispensing opening;
   e. a scraper adjacent the top of the housing and the first side effective to collect unused liquid build material from a radiation transparent flexible build material carrier film and direct the unused liquid build material into the liquid feed material cartridge; and
   f. a collection reservoir adjacent the scraper to receive the unused liquid build material that is directed into the liquid feed material cartridge.

2. The disposable liquid feed material cartridge according to claim 1 further comprising a filter positioned between the collection reservoir and the solidifiable liquid build material reservoir effective to collect solid particulate matter and pass unused liquid build material to the solidifiable liquid build material supply reservoir.

3. The disposable liquid feed material cartridge according to claim 1 further comprising a scraper recovery channel effective to receive and direct unused liquid build material from the scraper into the collection reservoir.

4. The disposable liquid feed material cartridge according to claim 2 further comprising the fluid flow control device being a valve.

5. The disposable liquid feed material cartridge according to claim 2 further comprising the fluid flow control device further being a pump effective to move solidifiable liquid build material from the solidifiable liquid build material reservoir to a dispensing chamber adjacent the dispensing opening.

6. The disposable liquid feed material cartridge according to claim 4 further comprising the valve shutting or opening the flow of solidifiable liquid build material from the solidifiable liquid build material reservoir to the dispensing opening and shutting or opening the flow of unused liquid build material from the scraper into the collection reservoir.

7. The disposable liquid feed material cartridge according to claim 1 further comprising the dispensing opening being an elongated narrow opening.

8. The disposable liquid feed material cartridge according to claim 1 further comprising the radiation transparent flexible build material carrier film being an endless belt.

9. The disposable liquid feed material cartridge according to claim 5 further comprising the pump feeding the solidifiable liquid build material to the dispensing chamber via a conduit.

10. The disposable liquid feed material cartridge according to claim 9 further comprising the dispensing chamber having at least one drain hole effective to permit solidifiable liquid build material to drain from the chamber back into the solidifiable liquid build material supply reservoir.

11. The disposable liquid feed material cartridge according to claim 9 further comprising an open topped dam adjacent the dispensing chamber and below the collection reservoir effective to retain a supply of the solidifiable liquid build material in the dispensing chamber and to permit excess solidifiable liquid build material in the dispensing chamber to overflow and return to the solidifiable liquid build material supply reservoir.

12. The disposable liquid feed material cartridge according to claim 1 further comprising the radiation transparent flexible build material carrier film being a reciprocatable sheet of film.

13. The disposable liquid feed material cartridge according to claim 1 further comprising the fluid flow control device further being a diaphragm pump.

14. The disposable liquid feed material cartridge according to claim 13 further comprising a controlled air supply coupled to the diaphragm pump.

* * * * *